United States Patent [19]
Cunkelman

[11] Patent Number: 5,503,469
[45] Date of Patent: Apr. 2, 1996

[54] APPARATUS TO PREVENT INADVERTENT DISCHARGE AND TRAPPING OF PIPE PRESSURE IN AN ELECTRO-PNEUMATIC LOCOMOTIVE BRAKE CONTROL SYSTEM

[75] Inventor: Brian Cunkelman, Wilmerding, Pa.

[73] Assignee: Westinghouse Air Brake Company, Wilmerding, Pa.

[21] Appl. No.: 380,804

[22] Filed: Jan. 30, 1995

[51] Int. Cl.$^6$ ..................................................... B60T 15/14
[52] U.S. Cl. ................................. 303/15; 303/20; 303/25
[58] Field of Search ................................... 303/15, 20, 3, 303/25–30, 68, 69, 33, 36, 38, 81, 86, 16, 17, 18

[56] References Cited

U.S. PATENT DOCUMENTS

| | | | |
|---|---|---|---|
| 4,904,027 | 2/1990 | Skantar et al. | 303/15 |
| 5,192,118 | 3/1993 | Balukin et al. | 303/15 |
| 5,222,788 | 6/1993 | Dimsa et al. | 303/15 |
| 5,390,988 | 2/1995 | Shank | 303/15 |

Primary Examiner—Douglas C. Butler
Attorney, Agent, or Firm—James Ray & Associates

[57] ABSTRACT

A microporccessor based electro-pnuematic brake control system for a railway train including both an automatic brake control system and an independent brake control system, in which the independent brake control system includes an application electro-pneumatic valve to control application of air pressure to locomotive brake cylinders in response to an application control signal, and a release electro-pneumatic valve to control release of air pressure from the locomotive brake cylinders in response to a release brake control signal. The application electro-pneumatic valve is biased to a normally closed position, in the absence of a application brake control signal thereto, to prevent venting of application air pressure from the locomotive brake cylinders in the event of a power failure, while the release electro-pneumatic valve is biased to a normally open position, in the absence of a release brake control signal thereto, to prevent trapping of air pressure in the locomotive brake cylinders in the event of a power failure. In addition, the release electro-pneumatic valve is provided with a restricted outlet port to retard exhaust of air from the locomotive brake cylinders in the event if a power failure following a brake application. On brake control systems also having an mu valve to cut-off the independent brake control system in a dead locomotive in a consist, the mu valve is biased to normally be in a closed position to prevent venting of application air pressure via the mu valve in the event of a power failure.

18 Claims, 1 Drawing Sheet

APPARATUS TO PREVENT INADVERTENT DISCHARGE AND TRAPPING OF PIPE PRESSURE IN AN ELECTRO-PNEUMATIC LOCOMOTIVE BRAKE CONTROL SYSTEM

FIELD OF THE INVENTION

The present invention relates generally to a microprocessor based electro-pneumatic type locomotive control system, and more particularly to new and improved valve arrangement in the independent brake control circuit that will prevent inadvertent trapping of independent application and release pipe pressure under normal operations in the event of a power failure, and to further embodiments that will also prevent inadvertent discharge of independent application and release pipe pressure under normal operations in the event of a power failure, as well as further embodiment that will eliminate certain brake problems associated with transferring a locomotive from a lead locomotive to a dead locomotive in a consist status.

CROSS REFERENCE TO RELATED APPLICATIONS

The invention taught in this patent application is closely related to the inventions taught in the following issued U.S. Patents: U.S. Pat. No. 4,904,027, "Digital Air Brake Control System", issued Feb. 27, 1990; U.S. Pat. No. 5,192,118, "Electro-pneumatic Locomotive Brake Control System", issued Mar. 9, 1993; and U.S. Pat. No. 5,222,788, Microprocessor Based Electro-pneumatic Locomotive Brake Control System Having Brake Assurance Circuit", issued Jun. 29, 1993. Each of the above-referenced patents are assigned to the assignee of this invention. Additionally, the teachings of each of these patents are incorporated herein by reference thereto.

BACKGROUND OF THE INVENTION

Modern-day locomotive controls, including the locomotive brake control system, incorporate computer technology to reduce hardware and to facilitate adaption of the system to various customer requirements. In one such brake control system, a cab mounted, handle operated, brake command controller outputs the desired brake command signal to a microprocessor unit, which interprets the brake command signal in terms of a feedback signal indicative of the air pressure in an equalizer reservoir, and then effects operation of application or release electro-magnetic valves to adjust the equalizer reservoir pressure in accordance with the brake command signal.

A high capacity pneumatic relay valve device is employed to vary the trainline brake pipe pressure in accordance with variations of the equalizing reservoir pressure, in order to control the railway car brakes. A so-called brake pipe control circuit of the afore-mentioned brake control system is shown and described in the above-cited references, which are incorporated herein by reference.

The brake control system further includes an automatic brake control circuit having electro-pneumatic application and release valves, as well as an independent brake control circuit which includes additional electro-pneumatic application and release valves. The automatic brake control system is primarily intended for use when a train consist is made-up, for applying the brakes to all cars as well as the locomotives therein, while the independent brake control system is primarily intended for use when one or more locomotives are driven independent of any cars connected therewith when the automatic brake pipe lines may not be interconnected. The automatic brake control electro-pneumatic valves are operated by the microprocessor in response to changes in brake pipe pressure initiated by the brake pipe control circuit in accordance with movement of an automatic brake handle of the brake command controller. Another high capacity pneumatic relay device regulates the pressure in the locomotive brake cylinders according to the pressure output (brake pipe pressure) of the automatic brake control circuit application and release electro-pneumatic valves.

The electro-pneumatic valves in the brake pipe control circuit and in the locomotive brake cylinder control cylinder are arranged to assume a pressure release state, in the event of a power loss at the microprocessor unit. In consequence of such a power loss, therefore, brake pipe pressure is reduce while, concurrently, the locomotive brake cylinder pressure is released. A pneumatic backup control valve in the locomotive automatic brake control circuit is provided to establish locomotive brake cylinder pressure in response to the aforementioned reduction of brake pipe pressure resulting from such fail-safe operation of the electro-pneumatic valves in the brake pipe control circuit, there being a double check valve to separate the pneumatic backup control valve from the electro-pneumatic valves in the locomotive brake cylinder control circuit.

The pneumatic backup control valve includes a piston valve assembly subject on opposite sides to compressed air in the brake pipe and in the control reservoir. When brake pipe pressure is reduced, the resultant pressure differential forces the piston valve assembly to an application position, wherein the control reservoir air supplies the brake cylinder pilot line to establish the locomotive brake pressure until a force balance is restored across the piston valve assembly. In this manner, the piston valve assembly seeks a lap position in which the supply of brake cylinder pressure is terminated at a value corresponding to the brake pipe pressure reduction in effect.

The locomotive brake cylinder pressure may be released independently of the car brakes by means of a quick release valve associated with the pneumatic backup control valve. A pressure signal supplied to the quick release valve, when a quick release switch is activated, initiates this "bail-off" or quick release function. The brake pipe and control reservoir pressures are communicated via the quick release valve to establish pressure equalization across the piston valve assembly, when the quick release switch is actuated. In this manner, the control reservoir pressure is effectively equalized with the reduced brake pipe pressure, such that a spring force acting on the piston valve assembly, is effective to force the piston valve assembly to release position and the locomotive brake cylinder pressure is exhausted.

In order to reapply the brakes, the quick release switch is deactuated to interrupt communication between the brake pipe and control reservoir pressures via the quick release valve, so that a subsequent reduction of brake pipe pressure is effective to produce a further pressure differential across the piston valve assembly. In response to this further pressure differential, the piston valve assembly will return to the application position and reestablish the supply of control reservoir pressure to the brake cylinder pilot line to reapply the locomotive brake.

In the event of a power failure at the microprocessor, brake pipe pressure is reduced to zero due to the fail-safe configuration of the electro-pneumatic valves in the brake pipe control circuit, which would, therefore, allow the locomotive to be moved without the ability to obtain any automatic locomotive braking whatsoever. The above-noted U.S. Pat. No. 5,222,788 discloses a circuit modification to correct this shortcoming by providing a microprocessor means having a regulated source of electrical power for controlling the first electro-pneumatic valve means in accordance with the brake command signal, and a brake assurance means for establishing an energized condition of the second electro-pneumatic valve means in response to a loss of the regulated source of electrical power.

In addition to the above, it had been found that in the event of a power failure, it was also possible to inadvertently trap or discharge the air pressure in the independent application and release pipe, controlled by the independent brake circuit, which thereby causes the air in the independent application and release pipe to be inadvertently trapped if the brake was applied at the time of power failure, or to be inadvertently discharged if the brake was not applied at the time of power failure. If air were trapped in the independent application and release pipe, air would be trapped at an equal pressure within the locomotive brake cylinders, causing the locomotive to remain with it brake applied, which would not allow it to be moved. On the other hand, if the air were discharged from the independent application and release pipe, the independent brake control system would not function if the locomotive were moved. While the above referenced patent teaches a system that will permit the automatic brake system to be functional in the event of a power failure, there are times, in switch yards for example, when the brake pipe may not be interconnected, so that the automatic brake control system cannot be used. In those situations, therefore, a power failure can disactivate the only functional brake control system; i.e., the independent brake control system.

SUMMARY OF THE INVENTION

The present invention is predicated upon a new and improved microprocessor based electro-pneumatic type locomotive brake control system and particularly an independent brake control circuit that prevents inadvertent trapping of the independent application and release pipe pressure in the event of a power failure, thereby assuring that the locomotive is not rendered inoperable with its independent brakes locked-on in the event of a power failure, and which can be further modified to assure that the independent application and release pipe pressure is not inadvertently discharged in the event of a power failure, or dischargeable when changing a locomotive from a lead locomotive to a dead locomotive in a consist.

In the prior art brake control system as described above and modified pursuant to U.S. Pat. No. 5,192,118, the two electro-pneumatic valves which control application and release of air pressure at the independent application and release pipe, are biased to normally be in a closed position when not activated in response to a brake control signal. If the electro-pneumatic release valve is closed at the time of a power failure, compressed air in the independent application and release pipe becomes trapped therein which causes the locomotive brake cylinders to have air trapped therein at the same pressure, which may not allow the locomotive to be moved. Pursuant to this inventive independent brake control circuit, the release electro-pneumatic valve is biased to be normally open, in the absence of a closing signal, to permit the release of air from independent application and release pipe in the event of a power failure, while the application electro-pneumatic valve is biased to be closed in the absence of an opening signal, to control the application of air to independent application and release pipe. If a brake application signal should be communicated to the circuit immediately prior to a power failure, a modified embodiment of this invention provides a restricted release orifice in the release electro-pneumatic valve vented to the atmosphere, so that air pressure within the independent application and release pipe can be maintained for a period of time sufficient to keep the locomotive brake cylinders in an applied brake condition to bring the locomotive to a stop.

As still another embodiment of this invention, particularly for use with circuits having a so-called mu valve, a re-arranged and spring biased mu valve is provided, as described below, that will serve to maintain the required braking air pressure in the independent application and release pipe and not be vented through such an open mu valve. Specifically, in some prior art independent brake control circuit, a non-spring biased, mu valve is provided so that the independent brake control system can be cut-off at dead locomotives in a consist, from a lead or controlling locomotive. Normally, the mu valve is manually operated to either an open or a closed position, and is placed on the exhaust side 88 of the relay portion of the relay valve 82. In the event of a power failure, the open mu valve can cause the air pressure in independent application and release pipe to be vented, with the result that the controlling locomotive could be moved while having no operable independent brake control. Pursuant to the modified embodiment of this invention, the mu valve, identified MV in FIG. 1, is spring biased to normally be in a closed position, and is re-positioned from the outlet to the supply side of the relay valve 82. Therefore, in the event of a power failure, the spring biased mu valve will close by virtue of the spring bias, and maintain any brake pressure within independent application and release pipe 92. In addition, if a single failure should occur in the application electro-pneumatic valve within a lead locomotive, such that the valve is incapable of pressurizing the chamber in the relay valve 82 sufficient to lift the piston therein to allow communication with the independent application and release pipe 92, the modified mu valve will act as a check valve to allow pressure build-up in independent application and release pipe 92 as necessary to make a brake application.

OBJECTS OF THE INVENTION

It is, therefore, the primary objects of the present invention to provide a new and improved microprocessor based electropneumatic type locomotive control system having an improved valve arrangement in the independent brake control circuit that will prevent inadvertent trapping and/or inadvertent discharge of independent application and release pipe pressure under normal operations in the event of a power failure.

Another object of the present invention to provide a new and improved microprocessor based electro-pneumatic type locomotive control system having a modified release electro-pneumatic valve in the independent brake control circuit that will prevent inadvertent trapping of compressed air in the locomotive brake cylinders in the event of a power failure.

A further object of the present invention to provide a new and improved microprocessor based electro-pneumatic type locomotive control system having a modified release electro-pneumatic valve in the independent brake control circuit that will prevent inadvertent quick discharge of compressed air in the locomotive brake cylinders in the event of a power failure.

Still another object of the present invention to provide a new and improved microprocessor based electro-pneumatic type locomotive control system having a modified release electro-pneumatic valve in the independent brake control circuit that will retard discharge of compressed air in the locomotive brake cylinders in the event of a power failure that will thereby avoid a catastrophic discharge.

A still further object of the present invention to provide a new and improved microprocessor based electro-pneumatic type locomotive control system having a modified mu valve in the independent brake control circuit that will prevent inadvertent discharge of compressed air in the locomotive brake cylinders in the event of a power failure.

An additional object of the present invention to provide a new and improved microprocessor based electro-pneumatic type locomotive control system having a modified mu valve arrangement in the independent brake control circuit that will function as check valve to facilitate build-up of pressure in the relay valve following a power failure.

These and other objects and advantages of this invention will be realized from a full understanding of the following detailed description, particularly when read in conjunction with the attached drawing, as described below.

DESCRIPTION OF A PREFERRED EMBODIMENT OF THE INVENTION

Figure 1:
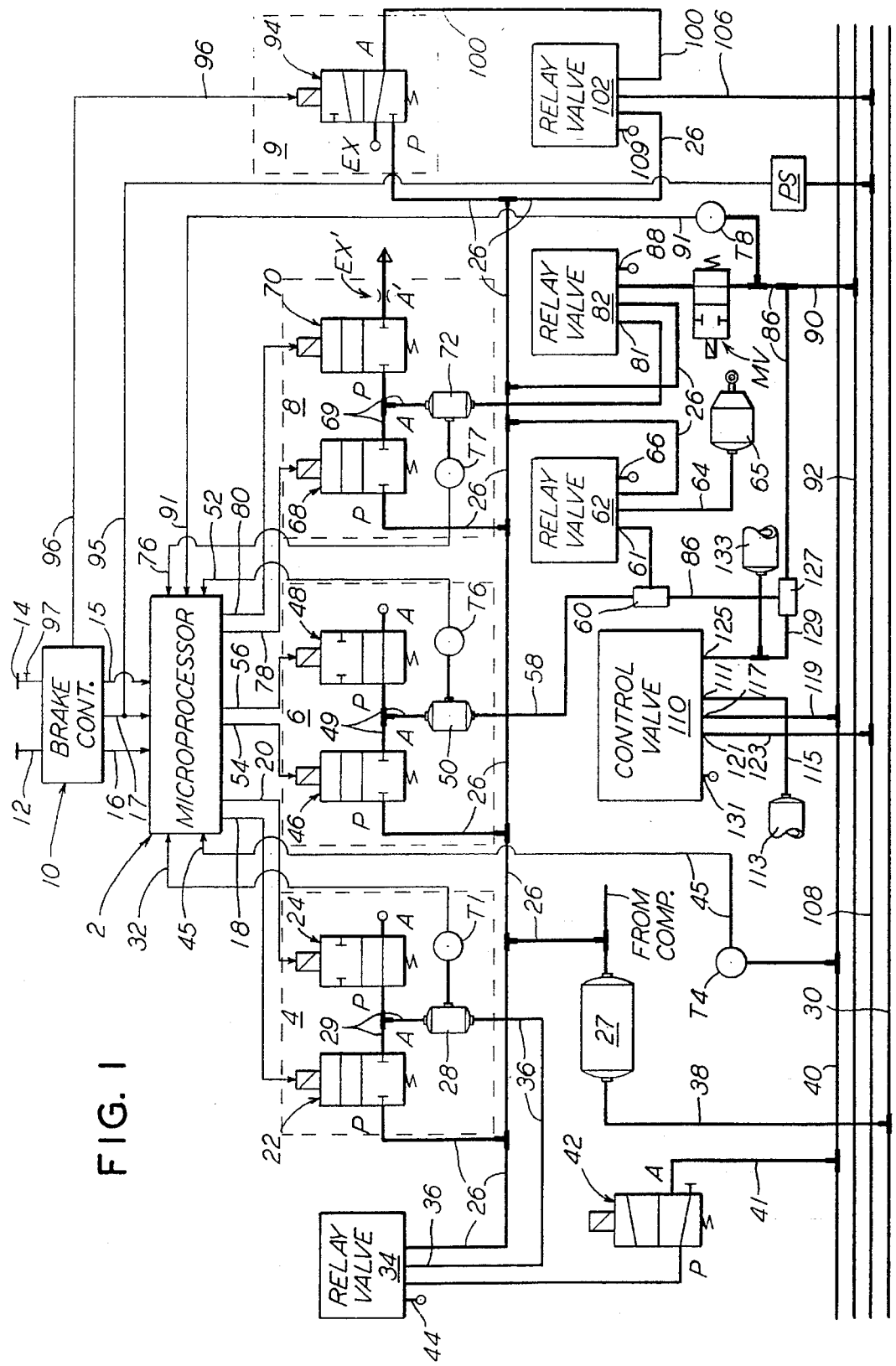
FIG. 1 is a block diagram of an electro-pneumatic brake control system arranged in accordance with this invention.

Referring now to FIG. 1, there is shown a locomotive electro-pneumatic brake control system having a microprocessor 2 that controls a brake pipe pressure control circuit 4, a locomotive automatic brake control circuit 6, a locomotive independent brake control circuit 8, and a quick release circuit 9. Microprocessor 2 receives input signals from a brake command controller 10 having an automatic brake control handle 12 and an independent brake control handle 14. But for the inventive features of this invention, the circuit shown in FIG. 1 is substantially the same as that shown and disclosed in the above-cited U.S. Pat. No. 5,192,118.

Manual operation of automatic brake control handle 12 to one of a plurality of discrete selected positions between brake release and full service positions establishes a level of brake pipe pressure corresponding to brake release and desired level of application. The incremental handle position selected is converted into a corresponding electrical brake command signal by a suitable encoder, or the like, which is fed to microprocessor 2 via line 16. Microprocessor 2 responds to the brake command signal and generates a regulated 24 volt output signal at wires 18 and 20 via which the solenoid operators of two-way, spring returned, application and release electro-magnetic valves 22 and 24 are actuated. Application valve 22 is normally closed and release valve 24 is normally open, the inlet P of application valve 22 being connected by a pipe 26 to a main reservoir 27 to which air is supplied from a compressor (not shown), and the outlet A of release valve 24 being a discharge to atmosphere. Main reservoir 27 is connected by a pipe 38 to a main reservoir equalizing pipe 30 that is interconnected between the units of a locomotive consist. A control reservoir 28 is connected to a pipe 29 via which outlet A of application valve 22 is connected to inlet P of release valve 24. A pressure transducer T1 monitors the pressure in control reservoir 28 and transmits a corresponding feedback signal to microprocessor 2 via wire 32.

The control port of a high capacity pneumatic relay valve 34 is connected via pipe 36 to control reservoir 28. Relay valve 34 may be a conventional, well known C-2 type relay valve typically employed in the 26 type locomotive brake valves and also in the 30-CW module manufactured by Westinghouse Air Brake Company. Relay valve 34 further included a supply port that is connected by pipe 26 to main reservoir 27, a delivery port that is connected by a pipe 41 to brake pipe 40, and an exhaust port 44 that is connected to the atmosphere. An electro-pneumatic cut-out valve 42 is provided in pipe 41 having a normally closed position in which its inlet P is cut-off from outlet A, and an open position in which inlet A is communicated with outlet P. Cut-out valve 42 is open on lead units to establish communication between brake pipe 40 and relay valve 34 and closed on train units to interrupt such communication. Relay valve 34 operates to vary the pressure in train brake pipe 40 in accordance with the pressure in control reservoir 28, supplying air from main reservoir 27 to pipe 41 or releasing air from brake pipe 40 via pipe 41 and exhaust pipe 44. The train brake pipe 40 carries pressure to the cars in the train, the brakes of which are controlled in accordance with variations of brake pipe pressure in a well known manner.

The locomotive automatic brake control circuit 6 is controlled in accordance with either the brake pipe pressure, as monitored by transducer T4, which transmits a corresponding electrical feedback signal via wire 45 to microprocessor 2 and/or independent application and release pipe 92 pressure as monitored by transducer T8, which also transmits a corresponding electrical feedback signal via wire 91 to microprocessor 2. This permits the microprocessor to establish the locomotive brake cylinder pressure.

Locomotive automatic brake control circuit 6 consisted of a normally closed, two-way, spring returned, electro-pneumatic application valve 46, a normally open two-way, spring returned, electro-pneumatic application valve 48, a control reservoir 50 and a pressure transducer T6. Inlet P of application valve 46 is connected via pipe 26 to main reservoir 27, while outlet A of release valve 48 is connected to the atmosphere. Reservoir 50 is connected between outlet A of application valve 46 and inlet P of release valve 48 via pipe 49. Transducer T6 instantaneously monitors the pressure in reservoir 50 and transmits a corresponding electrical feedback signal to microprocessor 2 via wire 52. The solenoid operators of the respective application and release valves 46 and 48 are connected by wires 54 and 56 to microprocessor 2 which is capable of supplying 24 volts to these control wires under normal operating conditions. The pressure in control reservoir 50 is regulated by these electro-pneumatic application and release valves in reverse relationship and at a predetermined relationship relative to brake pipe pressure changes. Reservoir 50 is connected by a pipe 58 to one inlet of a double check valve 60, the outlet of which is connected via pipe 61 to the control port of a high capacity pneumatic relay valve 62. This relay valve 62 may be a well known, standard J-type relay valve device manufactured by Westinghouse Air Brake Company, further having a supply port that is connected by pipe 26 to main reservoir 27, a delivery port that is connected by pipe 64 to the locomotive brake cylinder device 65, and an exhaust port 66 that is connected to the atmosphere. Relay valve 62 provides the required high capacity to supply compressed air from main reservoir pipe 26 to brake cylinder device 65, and to release brake cylinder pressure via exhaust port 66, in accordance with the pressure level established in reservoir 50.

The locomotive independent brake control circuit 8 also consists of a pair of solenoid operated, spring returned, two-way, electro-pneumatic valves, specifically, an application valve 68, and a like release valve 70, a control reservoir 72 and a transducer T7. Inlet P of application valve 68 is connected by pipe 26 to main reservoir 27, while outlet A' of release valve 70 is connected to the atmosphere via a restricted orifice EX'. Reservoir 72 is interconnected between outlet A of application valve 68 and inlet P of release valve 70 via pipe 69. Transducer T7 instantaneously monitors the pressure in reservoir 72 and transmits a corresponding electrical feedback signal to microprocessor 2 via wire 76. Pursuant to prior art practices, application and release valves 68 and 70 are normally closed, their respective 24 volt solenoid operators de-energized through microprocessor 2 connected wires 78 and 80. Pursuant to this invention, however, release valve 70 is biased to be normally open, so that in the event of a power failure, pressure is vented from the control chamber and reservoir 72, so that the relay valve will vent the air pressure from the locomotive brake cylinders.

Independent brake control handle 14 of controller 10 generates an electrical brake command signal that is transmitted to microprocessor 2 via wire 15 according to the selected position of handle 14 in a manner substantially the same as that for controlling the automatic application and release valve solenoids in the brake pipe control circuit 4 as described above. A pipe 81 is connected between reservoir 72 and the control port of a relay valve 82, such as a J-type relay valve device as utilized in automatic brake control circuit 6 described above. This relay valve 82 further includes a supply port that is connected by pipe 26 to main reservoir 27, a delivery port that is connected by pipe 86 to the control port of relay valve 62 via the other inlet of double check valve 60 and pipe 61, and an exhaust port 88 that is connected to the atmosphere. A branch pipe 90, of pipe 86, is connected to an independent application and release pipe 92 that is interconnected between the respective of the locomotive consist. Relay valve 82 provides the high capacity air requirement for pipe 92.

Quick release control circuit 9 includes a solenoid operated, spring returned, three-way, electro-pneumatic quick release valve 94, the solenoid of which is connected by wire 96 to brake controller 10 to provide a quick release signal when a manually operable, quick release switch 97 is actuated. Preferably, this quick release switch is incorporated in independent brake control handle 14 in such a way as to permit the operator to actuate the quick release switch, while at the same time manipulate the handle 14 for independent brake control.

Quick release valve 94 includes an inlet P that is connected by a pipe 26 to main reservoir 27, an outlet EX that is connected to the atmosphere, and an outlet A that is connected by a pipe 100 to the control port of a high capacity pneumatic relay valve 102. The relay valve 102 further includes a supply port to which main reservoir 27 is connected by pipe 26, a delivery port connected by pipe 106 to an actuating pipe 108, and an exhaust port 109 connected to the atmosphere. Relay valve 102 may also be a well known J-type relay valve device, and is provided to handle the high capacity air requirement of actuating pipe 108, which runs through the locomotive consist.

Associated with quick release circuit 9 is a pressure switch PS that is connected to actuating pipe 108 in order to provide an electrical signal to microprocessor 2 via wire 95 indicative of a quick release operation being initiated on a lead locomotive. This signal provides the means by which a trailing locomotive automatic brake application may be quick released in conjunction with release of the lead locomotive automatic brake application when the quick release switch 97 is actuated on the lead locomotive.

Independent brake control circuit 8 is normally operated by movement of independent brake control handle 14 of brake controller 10 at the lead or controlling locomotive from a release position to an application position, the degree of application corresponding to the position of handle 14 in a brake application zone between release and full application positions. Movement of handle 14 to an application position, either from release position or from a lower application position within the application zone, is encodes to provide a brake command signal at wire 15, the signal being greater than the signal prior to such movement of handle 14, as reflected by the feedback signal from transducer T7 effective at wire 76. The polarity of the difference between these signals prompts microprocessor 2 to energize wire 78 and de-energize wire 80. Application of valve 68 of independent control circuit 8 is thus operated to its open position in which inlet P is connected to outlet A, and release valve 70 is operated to its closed position in which inlet P is cut-off from outlet A'. Pressure in main reservoir 27 is thus supplied to control reservoir 72 via pipe 26, the open application valve 68 and pipe 69 until such time as the control reservoir pressure, as monitored by transducer T7 builds up to a value corresponding to the selected position of handle 14. When this occurs, the electrical signal at wire 15 and feedback wire 76 will be substantially the same to cause microprocessor 2 to de-energize wire 78 and encoder wire 80. This in turn causes application and release valves 68 and 70 to assume a closed position, in which further supply and release of pressure in control reservoir 72 is withheld until such time as further difference signal develops between brake command wire 15 and feedback wire 76. The polarity of such a difference signal determines whether the control reservoir 72 pressure increases further or decreases.

Pressure in control reservoir 72 is effective at the control port of relay valve 82, which in turn supplies air from main reservoir 27 to double check valve 127 via pipes 26 and 86. In the absence of a brake application via either the automatic locomotive brake control circuit 6 or back-up control valve device 112, the independent brake control pressure in pipe 86 will pass through the double check valve 127 and double check valve 60 to operate relay valve 62 and accordingly control the pressure delivered to the locomotive brake cylinders 65. Even if the locomotive brake cylinder pressure is applied through the automatic brake control circuit at some value less than full service, the independent brake control circuit can provide higher brake cylinder pressure at the locomotive independently of the car brakes throughout the train.

This independently controlled locomotive brake pressure is also connected from pipe 86, of relay valve 82, to pipe 90 leading to independent application and release pipe 92 to transmit the independent brake control pressure to a trailing one or more locomotives. The independent brake control pressure is limited to a maximum value that is compatible with locomotive brake control equipments that employ multiplying relay valves, such as the standard 26-L type. Transducer T8 converts the independent brake control pressure to a corresponding electrical feedback signal that is connected via wire 91 to microprocessor 2. The microprocessor is programmed to multiply this feedback signal or the independent brake control pressure and to control the locomotive brake pressure through electro-pneumatic valves 46 and 48 of the locomotive automatic brake control circuit 6 to obtain the desired independent brake control pressure, whether the locomotive is connected for lead or trail operating status. Electro-pneumatic valves 46 and 48 are energized until the feedback signal from transducer T6 to microprocessor 2 via wire 52 corresponds to the feedback signal via wire 91, at which point the electro-pneumatic valves 46 and 48 will assume a lap condition. In the event locomotive brake cylinder pressure is already present at the time the independent brake is applied, the microprocessor will only be effective to increase the locomotive brake cylinder pressure to the extent of the independent brake control signal and the above-mentioned multiplication factor for which the microprocessor is programmed.

The previously cited U.S. Pat. No. 5,192,118, which is incorporated herein by reference, adequately describes the initial charging, application of the automatic brake system, including backup brakes, the quick release of automatic brakes, as well as the effect of microprocessor malfunction on those facets of the control circuit. It should be further noted that FIG. 1 in the above cited patent is, but for the inventive features taught herein, identical to FIG. 1 herein, and any element not deemed sufficiently relevant to be discussed here, is discussed in the cited patent. That patent does not, however, describe the effect a power failure can have on the prior art independent brake control system, which was described above, nor does it suggest the inventive features disclosed herein.

Pursuant to a basic embodiment of this invention, the bulk of the microprocessor based electro-pneumatic brake control system can be substantially like that of the prior art as partially described above, which should include an independent brake control system having an independent brake control handle 14 including means for generating an independent brake command signal in accordance with a selected position of said independent brake control handle 14, a microprocessor means 2 having a regulated source of electrical power adapted to receive an independent brake command signal, and provide either an application brake control signal or a release brake control signal, in response thereto, as well as an independent brake control circuit 8 adapted to receive the application brake control signal or the release brake control signal, which includes an application electro-pneumatic valve means 68 for controlling application of air pressure to locomotive brake cylinders in response to the application control signal, and a release electro-pneumatic valve means 70 to control release of air pressure from the locomotive brake cylinders in response to a release brake control signal.

Unlike the prior art system, however, the release electro-pneumatic valve 70, is of the type that is biased to be normally open, in the absence of a closing signal, while the application electro-pneumatic valve 68, like that of the prior art, is biased to be closed in the absence of an opening signal, to control the application of air to independent application and release pipe 92. Accordingly, in the event of a power failure, release electro-pneumatic valve 70, being normally biased in the open position, will permit the release of air from independent application and release pipe 92, so that the power failure will not render the locomotive inoperable as a result of the locomotive brake cylinder 65 having compressed air trapped therein at a pressure equal to that of the air pressure in the independent application and release pipe 92.

In addition to the above, it is also preferable that outlet A' of release electro-pneumatic valve 70 be provided with a restricted orifice EX' having a diameter of about 0.110 inch. In this way, if a brake application signal should be communicated to the independent brake control circuit 8 immediately prior to a power failure, release electro-pneumatic valve 70, being normally biased in the open position, will vent air from independent application and release pipe 92, as noted above, but because of the restricted release orifice EX' in outlet A' of electro-pneumatic valve 70, the air will be more slowly vented to the atmosphere, so that air pressure within the independent application and release pipe 92 can be maintained for a period of time sufficient to keep the locomotive brake cylinders in an applied brake condition to bring the locomotive to a stop. To optimize this effect, control reservoir 72 should ideally have a volume of at least about 45 cubic inches. It has been found that an air pressure of about 45 psig is the maximum necessary pressure for normal maximum independent brake application. If the application electropneumatic valve is provided with an inlet orifice P of about 0.125 inch diameter, with the outlet orifice EX' on release electropneumatic valve 70 sized at about 0.110 inch, and control reservoir 72 has an ample volume of at least about 45 cubic inches, sufficient air pressure can be maintained in independent application and release pipe 92 as well as the chamber of relay valve 82, to prevent a dangerously sudden loss of air pressure in the event of a power failure. That is to say, in the event of a power failure, the loss of air through orifice EX' will be sufficiently retarded to avoid a catastrophic loss of air.

As is known, some such microprocessor based electro-pneumatic brake control system are provided with a cut-off valve, commonly referred to an "multiple unit valve", or simply an "mu valve" designated MV in FIG. 1. Such a mu valve is not disclosed in any of the above-cited patents incorporated herein by reference, and is normally a simple non-spring biased, cut-off valve utilized to cutoff the independent brake control system of a trailing locomotives in a consist. Normally, the mu valve is manually operated to either an open or a closed position, and is placed on the outlet 88 of the relay portion of the relay valve 82. In the event of a power failure, such an open mu valve can cause the air pressure in independent application and release pipe 92 to be vented via the open mu valve, with the result that the controlling locomotive could be moved while having no operable independent brake control. Pursuant to a modified embodiment of this invention, the mu valve MU is spring biased to normally be in a closed position, and is repositioned from the exhaust 88 to the supply side of the relay valve 82, namely positioned on line 90, as shown in FIG. 1. Therefore, in the event of a power failure, the spring biased mu valve will close by virtue of the spring bias, so that it will not be a point of inadvertent air discharge, thereby assuring that the inventive, application and release valves 68 and 70 are free to function as above described. In addition, if a single failure should occur in the application electro-pneumatic valve within a lead locomotive, such that the valve is incapable of pressurizing the chamber in the relay valve 82 sufficient to lift the piston therein to allow communication with the independent application and release pipe 92, the closed mu valve will act as a check valve to allow pressure build-up in independent application and release pipe 92 as necessary to make a brake application.

While one embodiment of each of the inventive aspects of this invention has been described above, it should be apparat that any one of the aspects, or combinations of the various aspects, could be utilized without departing from the spirit of the invention. For example, the use of a simple release electro-pneumatic valve means 70 of the type being biased to a normally closed position could be used for the sole purpose of preventing the trapping of air in the locomotive brake cylinders upon a power loss. On the other hand, the use of a simple release electro-pneumatic valve means 70 having a restricted orifice could be utilized alone, if the sole objective were to prevent inadvertent discharge of air in the locomotive brake cylinders upon a power loss. Obviously, if the overall control system does not include an mu valve, then clearly there would be no need to modify the mu valve as taught herein. Clearly, other embodiments and modifications could be utilized without departing from the spirit of the invention.

I claim:

1. A microprocessor based electro-pneumatic brake control system for a railway locomotive having an automatic brake control system and an independent brake control system, said independent brake control system comprising:
   (a) a brake controller having an independent brake control handle including means for generating an independent brake command signal in accordance with a selected position of said independent brake control handle;
   (b) a microprocessor means having a regulated source of electrical power adapted to receive said independent brake command signal, and provide one of an application brake control signal and a release brake control signal, in response thereto;
   (c) an independent brake control circuit adapted to receive said application brake control signal and said release brake control signal, and having an application electro-pneumatic valve means for controlling application of air pressure to a locomotive brake cylinder in response to said application control signal, and a release electro-pneumatic valve means for controlling release of air pressure from said locomotive brake cylinder in response to said release brake control signal;
   (d) said application electro-pneumatic valve means being of the type biased to a normally closed position, in the absence of a application brake control signal thereto, to prevent venting of application air pressure from said locomotive brake cylinder in the event of a power failure; and
   (e) said release electro-pneumatic valve means being of the type biased to a normally open position, in the absence of a release brake control signal thereto, to prevent trapping of air pressure in said locomotive brake cylinder in the event of a power failure.

2. A microprocessor based electro-pneumatic brake control system, according to claim 1, in which said release electro-pneumatic valve means is provided with a release port vented to atmosphere, said release port having a restricted orifice as necessary to retard loss of air pressure from said locomotive brake cylinders in the event of a power failure following a brake application control signal.

3. A microprocessor based electro-pneumatic brake control system, according to claim 2, in which said restricted orifice has a diameter of about 0.110 inch.

4. A microprocessor based electro-pneumatic brake control system, according to claim 1, in which said application electro-pneumatic valve means is connected to a first chamber of a pneumatic relay valve.

5. A microprocessor based electro-pneumatic brake control system, according to claim 4, in which a second chamber of said pneumatic rely valve is connected to a control reservoir.

6. A microprocessor based electro-pneumatic brake control system, according to claim 5, in which said control reservoir has a volume of at lease about 45 cubic inches.

7. A microprocessor based electro-pneumatic brake control system, according to claim 6, in which said release electro-pneumatic valve means is provided with a release port vented to atmosphere, said release port having an orifice diameter of about 0.110 inch.

8. A microprocessor based electro-pneumatic brake control system, according to claim 7, in which said application electro-pneumatic valve means is connected to said first chamber of said pneumatic relay valve via an inlet port having an orifice diameter of about 0.125 inch.

9. A microprocessor based electro-pneumatic brake control system, according to claim 1, further including an mu valve adapted to cut-off said independent brake control system in a trailing locomotive in a consist including a control locomotive.

10. A microprocessor based electro-pneumatic brake control system, according to claim 9, in which said mu valve is a simple, manually operated open-close valve.

11. A microprocessor based electro-pneumatic brake control system, according to claim 10, in which said mu valve is biased to be in a normally closed position to prevent venting of application air pressure from said locomotive brake cylinders via said mu valve in the event of a power failure.

12. A microprocessor based electro-pneumatic brake control system, according to claim 11, in which said mu valve is connected to a supply side of a pneumatic relay valve.

13. A microprocessor based electro-pneumatic brake control system for a railway locomotive having an automatic brake control system and an independent brake control system, said independent brake control system comprising:
   (a) a brake controller having an independent brake control handle including means for generating an independent brake command signal in accordance with a selected position of said independent brake control handle;
   (b) a microprocessor means having a regulated source of electrical power adapted to receive said independent brake command signal, and provide one of an application brake control signal and a release brake control signal, in response thereto;
   (c) an independent brake control circuit adapted to receive said application brake control signal and said release brake control signal, and having an application electro-pneumatic valve means for controlling application of air pressure to a locomotive brake cylinder in response to said application control signal, and a release electro-pneumatic valve means for controlling release of air pressure from said locomotive brake cylinder in response to said release brake control signal;
   (d) said application electro-pneumatic valve means having an inlet port with a diameter of about 0.125 inch, and is of the type biased to a normally closed position, in the absence of a application brake control signal thereto, to prevent venting of application air pressure from said locomotive brake cylinder in the event of a power failure; and
   (e) said release electro-pneumatic valve means having a release port with a diameter of about 0.110 inch, and is of the type biased to a normally open position, in the absence of a release brake control signal thereto, to prevent trapping of air pressure in said locomotive brake cylinder in the event of a power failure.

14. A microprocessor based electro-pneumatic brake control system, according to claim 13, in which said application electro-pneumatic valve means is connected to a first chamber of a pneumatic relay valve, and a second chamber of said pneumatic rely valve is connected to a control reservoir having a volume of at lease about 45 cubic inches.

15. A microprocessor based electro-pneumatic brake control system, according to claim 14, further including an mu valve adapted to cut-off said independent brake control system in a trailing locomotive in a consist including a control locomotive, said mu valve being biased to be in a normally closed position to prevent venting of application air pressure from said locomotive brake cylinder via said mu valve in the event of a power failure.

16. A microprocessor based electro-pneumatic brake control system, according to claim 15, in which said mu valve is connected to a supply side of said pneumatic relay valve.

17. A microprocessor based electro-pneumatic brake control system for a railway locomotive having an automatic brake control system and an independent brake control system, said independent brake control system comprising:

(a) a brake controller having an independent brake control handle including means for generating an independent brake command signal in accordance with a selected position of said independent brake control handle;

(b) a microprocessor means having a regulated source of electrical power adapted to receive said independent brake command signal, and provide one of an application brake control signal and a release brake control signal, in response thereto;

(c) an independent brake control circuit adapted to receive said application brake control signal and said release brake control signal, and having an application electro-pneumatic valve means for controlling application of air pressure to a locomotive brake cylinder in response to said application control signal, and a release electro-pneumatic valve means for controlling release of air pressure from said locomotive brake cylinder in response to said release brake control signal; and (d) an mu valve adapted to cut-off said independent brake control system in a trailing locomotive in a consist including a control locomotive, said mu valve being biased to be in a normally closed position to prevent venting of application air pressure from said locomotive brake cylinder via said mu valve in the event of a power failure.

18. A microprocessor based electro-pneumatic brake control system, according to claim 17, in which said mu valve is connected to a supply side of a pneumatic relay valve.

* * * * *

UNITED STATES PATENT AND TRADEMARK OFFICE
CERTIFICATE OF CORRECTION

PATENT NO. : 5,503,469
DATED : April 2, 1996
INVENTOR(S) : Brian Cunkelman

It is certified that error appears in the above-indentified patent and that said Letters Patent is hereby corrected as shown below:

Column 2, line 15, delete "reduce" and insert --reduced--.

Column 3, line 21, delete "it" after with and insert --its--.

Column 4, line 48, delete "electropneumatic" and insert --electro-pneumatic--.

Column 8, line 13, delete "encodes" and insert --encoded--.

Column 10, line 16, delete "electropneumatic" and insert --electro-pneumatic--;

column 10, line 18, delete "electropneumatic" and insert --electro-pneumatic--;

column 10, line 29, delete "an" and insert --a--;

column 10, line 30, delete "an" and insert --a--;

column 10, line 33, delete "cutoff", second occurrence and insert --cut-off--;

UNITED STATES PATENT AND TRADEMARK OFFICE
CERTIFICATE OF CORRECTION

PATENT NO.   : 5,503,469
DATED        : April 2, 1996
INVENTOR(S)  : Brian Cunkelman It is certified that error appears in the above-indentified patent and that said Letters Patent is hereby corrected as shown below:

column 10, line 34, delete "locomotives" and insert --locomotive--;

column 10, line 61, delete "apparat" and insert --apparent".

Column 11, line 61, delete "rely" and insert --relay--;

column 11, line 65, delete "lease" and insert --least--.

Column 12, line 52, delete "a" and insert -- an--;

column 12, line 66, delete "rely" and insert --relay--;

column 12, line 67, delete "lease" and insert --least--.

In the Abstract, line 11, delete "a" and insert --an--.

In the Abstract, line 21, delete "if" and insert --of--.

Signed and Sealed this

Fourteenth Day of October, 1997

*Attest:*

BRUCE LEHMAN

*Attesting Officer*    *Commissioner of Patents and Trademarks*